US007916721B1

(12) United States Patent
Breau et al.

(10) Patent No.: US 7,916,721 B1
(45) Date of Patent: Mar. 29, 2011

(54) HOME ADDRESS SUBNET ASSIGNMENT FOR IPV6 BOOTSTRAPPING

(75) Inventors: Jeremy R. Breau, Leawood, KS (US); Hal S. Beech, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 212 days.

(21) Appl. No.: 11/935,159

(22) Filed: Nov. 5, 2007

(51) Int. Cl.
*H04L 12/56* (2006.01)

(52) U.S. Cl. ...................... 370/389; 709/222; 455/435.1

(58) Field of Classification Search ......................... None
See application file for complete search history.

(56) References Cited

U.S. PATENT DOCUMENTS

| | | | |
|---|---|---|---|
| 7,039,035 B2 * | 5/2006 | Droms et al. | 370/338 |
| 7,298,743 B2 * | 11/2007 | Markki et al. | 370/392 |
| 7,428,221 B2 * | 9/2008 | Thubert et al. | 370/255 |
| 7,496,057 B2 * | 2/2009 | Patel et al. | 370/310 |
| 7,561,553 B2 * | 7/2009 | Venkitaraman et al. | 370/338 |
| 7,564,825 B2 * | 7/2009 | Olivereau et al. | 370/338 |
| 2002/0031135 A1 * | 3/2002 | Inoue | 370/401 |
| 2003/0018810 A1 * | 1/2003 | Karagiannis et al. | 709/238 |
| 2003/0117965 A1 * | 6/2003 | Markki et al. | 370/254 |
| 2003/0161287 A1 * | 8/2003 | Venkitaraman et al. | 370/338 |
| 2006/0171370 A1 * | 8/2006 | Matsumoto et al. | 370/351 |
| 2009/0024732 A1 * | 1/2009 | Hirano et al. | 709/223 |

OTHER PUBLICATIONS

Ernst et al. "Mobile Networks Support in Mobile IPv6 (Prefix Scope Binding Updates", Mar. 2002, p. 1-21.*
Upadhyaya, S. "MIPv6 bootstrapping solution for split and integrated scenario using DHCPv6", draft-saumya-mi6-bootstrap-00. txt, Oct. 13 2006, p. 1-13.*
K. Chowdhury et al., "MIP-bootstrapping via DHCPv6 for the Intergrated Scenario," IETF Internet Draft, Oct. 15, 2005.
G. Giaretta et al., "Mobile IPv6 Bootstrapping in Split Scenario," IETF Internet Draft, Jun. 22, 2005.
H. Jang et al., "DHCP Option for Home Information Discovery in MIPv6," IETF Internet Draft, Aug. 24, 2006.

* cited by examiner

*Primary Examiner* — Daniel J Ryman
*Assistant Examiner* — Brian Roberts

(57) ABSTRACT

Systems and methods are provided for a home address subnet assignment for IPv6 bootstrapping. When a mobile-IPv6 router bootstraps, it receives a home address subnet prefix address (HoAp). The mobile-IPv6 router includes the HoAp and the mobile-IPv6 router's care-of address in a binding update, and sends the binding update to a home agent. The home agent associates the HoAp with the mobile-IPv6 router's care-of address. Thus, whenever the home agent receives a packet sent to an address with the same prefix as the HoAp, the home agent will forward the packet to the care-of address of the mobile-IPv6 router.

11 Claims, 8 Drawing Sheets

HOME ADDRESS SUBNET ASSIGNMENT FOR IPV6 BOOTSTRAPPING

FIELD OF THE INVENTION

The present invention relates to mobile-IPv6 and, more particularly, to obtaining and registering bootstrap parameters.

DESCRIPTION OF RELATED ART

Internet protocol version 4 (IPv4) is a standard used by electronic devices to communicate over a packet-switched network. IPv4 supports 32-bit IP addresses, and therefore can only provide 4.3 billion unique IP addresses. As the number of publicly available IP addresses is dwindling, many networks are assigned fewer IP addresses than they need. To overcome this problem, networks use a process called network address translation (NAT). With NAT, devices within a private network are assigned "private" IP addresses that are not routable outside of the network. A device, typically a router, on the private network has a both a private address and a "public" IP address that is routable outside of the private network. As traffic passes from a node on the private network to the public network, the router translates each packet's source address from the node's private IP address to the router's public IP address. The router tracks data about each active connection to allow it to determine where on the private network to send reply packets. Thus, using NAT, a network is not limited to the number of public IP addresses that the network has been assigned.

However, NAT has its drawbacks. For example, several internet protocols require that communication between two devices be end-to-end, and prohibit packets from being modified before they reach their destination. One such protocol is the authentication header IP security protocol (AH Ipsec). AH IPsec is used to verify the identity of a device sending a packet, and requires that the packet's source and destination IP addresses are not changed in route. If a device is using AH IPsec, and receives a packet from a node on a private network through a NAT enabled router, the router will change the packet's source address, and the AH IPsec device will reject the packet.

Internet protocol version 6 (IPv6) is considered the successor to IPv4 primarily because it supports a far greater number of unique IP addresses. IPv6 supports 128-bit addresses, and thus can provide approximately $5*10^{28}$ unique IP addresses. With so many IP addresses, it is unlikely that a network would be assigned fewer IP addresses than it needs. Therefore, NAT should be unnecessary on an IPv6 network, because each node on the network can be assigned with a public IP address.

Mobile-IPv6 allows mobile nodes to remain reachable at the same address while moving from one network to another. With mobile-IPv6, a mobile node obtains and uses a mobile-IP address referred to as a home address (HoA). Packets to and from the mobile-node are then routed through a centralized mobile-IPv6 home agent (home agent) located on the mobile node's home network, using a care-of address, which is a temporary IP address used by a mobile node while it is located on a foreign network.

If a mobile node is unaware of its home address or the address of its home-agent, it may "bootstrap" to obtain the information. With bootstrapping, a mobile node typically sends an authentication request to a network access server (NAS), which then interacts with an authentication, authorization, and accounting (AAA) server. The AAA server sends to the NAS the mobile node's home address and the address of the mobile node's home agent (bootstrap parameters). The NAS then relays the parameters to a dynamic host configuration protocol (DHCP) server, which is a device on a network that assists nodes in configuring IP addresses. The mobile node can then obtain the parameters from the DHCP server.

It is possible for a mobile-IPv6 enabled router to behave as a mobile node and move from one network to another while remaining reachable at its home address. Unfortunately, however, if the mobile-IPv6 router is routing packets to and from a node that has a public IP address, that node's public IP addresses will no longer be valid after the mobile-IPv6 router moves to a new network. This is because nodes rely on information broadcast by a network, such as address prefixes, when configuring their IP addresses. If the nodes move to a new network with the mobile-IPv6 router, the new network will not accept the nodes' old addresses because they were configured using different information.

To address this problem, the mobile-IPv6 router could use NAT to assign nodes it is serving with private, unchanging IP addresses. However, as discussed above, this will prevent the nodes from having end-to-end connectivity and from using certain protocols. Therefore, an improvement is desired.

SUMMARY OF THE INVENTION

The present invention advances over the state of the art by providing a mobile-IPv6 router with a home-address subnet prefix address (HoAp) when it bootstraps for information. The prefix address will enable the mobile-IPv6 router to assign nodes with a range of mobile-IP addresses that will remain reachable if the mobile-IPv6 router moves to a different network, because the prefix will be associated with the router.

As presently contemplated, when a mobile-IPv6 router bootstraps, it receives (1) a home address, (2) a home agent address, and (3) a HoAp. After receiving these bootstrap parameters and obtaining a care-of address, the mobile-IPv6 router sends two binding updates to the home agent. A binding update is a mobile-IPv6 message that enables mobile nodes to register, or "bind," information with a home agent. One binding update includes the mobile-IPv6 router's home address and its care-of address, and allows the home agent to associate the mobile-IPv6 router's home address with its care-of address. If the home agent receives a packet sent to the mobile-IPv6 router's home address, the home agent will forward the packet to the mobile-IPv6 router's care-of address.

The other binding update includes the HoAp and the mobile-IPv6 router's care-of address, and allows the home agent to associate the HoAp with the mobile-IPv6 router's care-of address. After receiving the binding update, when the home agent receives a packet sent to an address having the same prefix address as the HoAp, the home agent will forward the packet to the care-of address of the mobile-IPv6 router.

After registering the HoAp with the home agent, the mobile-IPv6 router will broadcast the HoAp in a router-advertisement message. Router advertisement messages contain network prefixes within prefix information fields that nodes use to statelessly autoconfigure IP addresses. Stateless autoconfiguration allows an IPv6 node to configure an IP address by combining local information with information broadcast by routers. IPv6 nodes that connect to the mobile-IPv6 router will use the HoAp included in the router advertisement to statelessly autoconfigure public, mobile-IP addresses having the same prefix as the HoAp.

Providing a mobile-IPv6 router with a prefix address is advantageous because it allows nodes served by the router to configure public mobile-IP address that remain reachable even if the router moves from one serving system to another.

The advantages of the invention will become apparent to those skilled in the art by reading the following detailed description, with reference where appropriate to the accompanying drawings.

Furthermore, it should be understood that the description provided in this summary and elsewhere in this document is intended to illustrate the invention by way of example only. Thus, other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and by software, firmware and/or hardware.

DETAILED DESCRIPTION

1. Exemplary Architecture a. Exemplary Network

Figure 1:
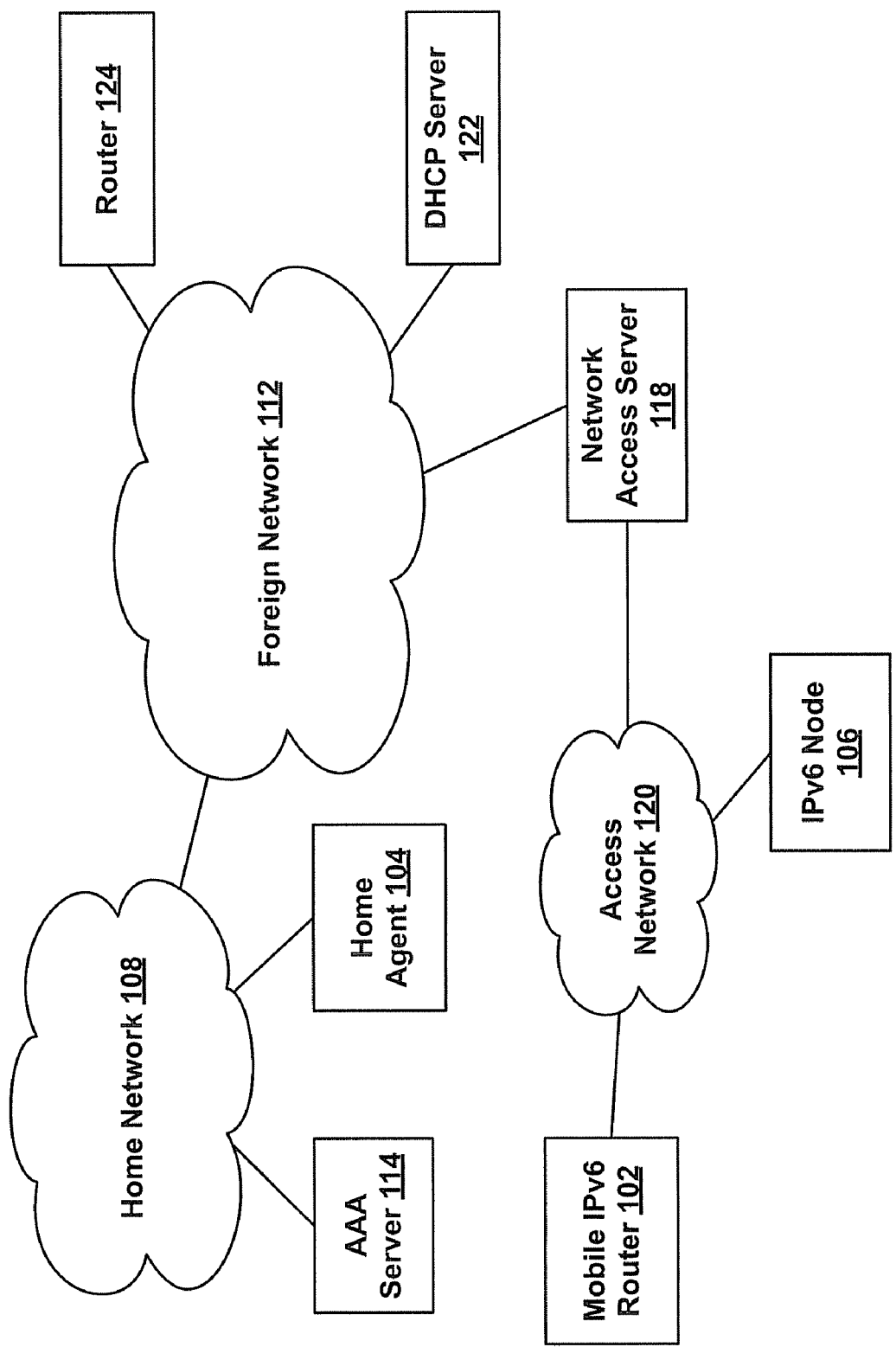
FIG. 1 is a simplified block diagram illustrating a typical mobile-IPv6 network.

FIG. 1 is a simplified block diagram depicting the functional arrangement and interaction between various network components in accordance with the exemplary embodiment. It should be understood that this network supports mobile-IPv6. Further, this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, various functions described herein as being performed by one or more entities may be carried out by hardware, firmware, and/or software.

As shown in FIG. 1, the network includes a home network 108, a foreign network 112, and an access network 120. Located on home network 108 is a home agent 104, and a AAA server 114. Located on foreign network 106 is a network access server 118, a DHCP server 122, and a router 124. Located on access network 120 is a mobile-IPv6 router 102, and an IPv6 node 106, It should be understood that any number of other entities could be present as well. For example, any number of mobile nodes could be located on home network 106, foreign network 112, and access network 120. Furthermore, any number of intermediate devices and networks could make up all or part of any of the communication links shown in FIG. 1. For example, there could be additional routers, wireless networks, or other devices, such as IP gateways and/or DHCP servers located on any of the networks.

In general, mobile-IPv6 router 102 is any device capable of (1) using mobile-IPv6 (or any other flavor of mobile-IP that is compatible with mobile-IPv6), (2) bootstrapping to obtain mobile-IPv6 address information, (3) broadcasting router advertisements, and (4) routing packets to and from IPv6 node 106.

Home agent 104 may be any network device such as a router, server, or workstation that is configured to maintain current location information for mobile node 102 and to relay packets to mobile-IPv6 router 102 in accordance with mobile-IPv6.

In general, IPv6 node 106 may be any device capable of using IPv6 (or any other flavor of IP that is compatible with IPv6). As examples, IPv6 node 106 may be, or may include one or more of the functions of, a cellular telephone, a voice-over-IP telephone, a laptop computer, or a personal digital assistant. Although IPv6 106 node appears as a single entity in FIG. 1, IPv6 node 106 may comprise many IPv6 nodes.

AAA server 114 may be any device capable of determining (1) whether a device is authorized to engage in mobile-IP communication, and (2) providing bootstrap parameters. AAA server 114 may use protocols such as RADIUS and DIAMETER for communications. AAA server 114 may keep records of the bootstrap parameters in a database. Additionally, AAA server 114 may communicate with home agent 104 in order to obtain the parameters.

Network access server (NAS), 118 provides mobile nodes such as mobile-IPv6 router 102, access to foreign network 112. Additionally, NAS 118 acts as a DHCP relay agent, which enables it to (1) intercept DHCP requests from nodes on access network 120, (2) append the bootstrap parameters to the DHCP request, and (3) forward the DHCP requests to DHCP server 122.

Mobile nodes, such as mobile-IPv6 router 102, may communicate with NAS 118 via access network 120. Access network 120 may be a radio access network (RAN) that communicates with mobile nodes via an air interface. Thus, access network 120 might be a wireless wide area network (WWAN) that communicates with mobile nodes using an air interface format such as cdma2000, EVDO, or GSM/GPRS. Access network 120 might also be a wireless metropolitan area network (WMAN) that communicates with mobile nodes using an air interface format such as IEEE 802.16 (WiMAX). Additionally, access network 120 might be a wireless local area network (WLAN) that communicates with mobile nodes using an air interface format such as IEEE 802.11, Bluetooth, HomeRF, or HiperLAN.

DHCP server 122 is located on foreign network 112. DHCP server 122 provides IP addresses to mobile nodes seeking to connect to foreign network 112. Additionally, DHCP server 122 receives bootstrap parameters from NAS 118, and returns those parameters to a mobile node in a DHCP reply message.

Router 124 is located on foreign network 112. Router 124 periodically broadcasts router advertisement messages to enable devices located on foreign network 112 to statelessly autoconfigure IP addresses.

b. Exemplary Mobile-IPv6 Router

Figure 2:
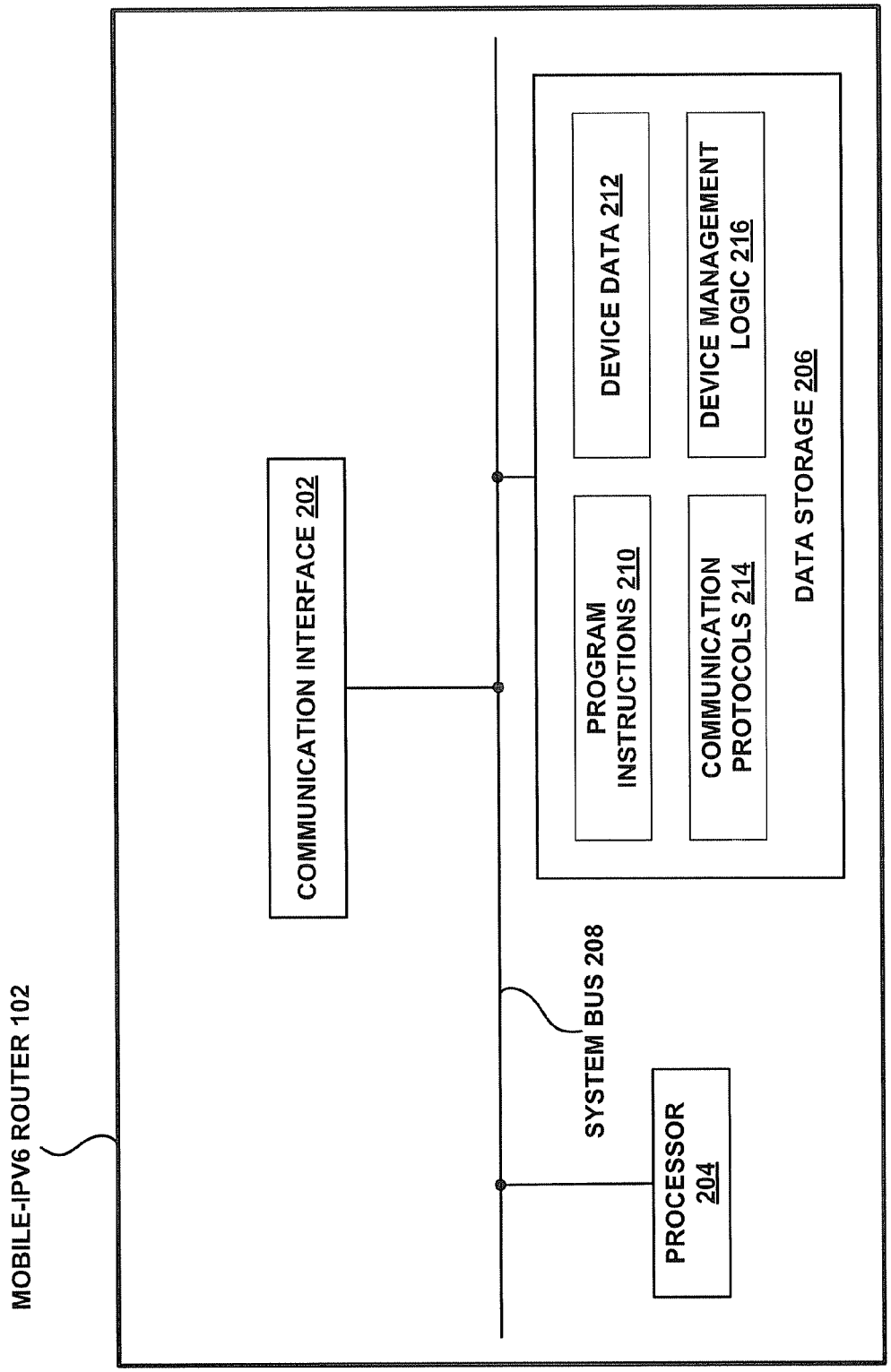
FIG. 2 is a simplified block diagram illustrating a typical mobile-IPv6 router.

FIG. 2 is a simplified block diagram of an exemplary mobile-IPv6 router, which may be used in accordance with exemplary embodiments. In particular, FIG. 2 depicts mobile-IPv6 router 102 of FIG. 1. As shown in FIG. 2, mobile-IPv6 router 102 includes a communication interface 202, a processor 204, and data storage 206, all of which may be communicatively linked by a system bus 208.

Communication interface 202 may include hardware and/or software that mobile-IPv6 router 102 may use to communicate over one or more packet-data networks such as foreign network 112, home network 108, correspondent network 110, and access network 120. Communication interface 202 may be configured to engage in wired and/or wireless communication, and thus may include a chipset arranged to communicate according to a protocol such as IEEE 802.11, a wired Ethernet interface, and/or one or more other types of communication interfaces. Communication interface 202 may make use of one or more antennas to facilitate wireless communication with one or more devices.

Processor 204 may control many operations of mobile-IPv6 router 102 by executing a set of program instructions 410 stored in data storage 206, and may comprise one or more general purpose processors, such as a microprocessor and/or a discrete digital signal processor.

Data storage 206 may store program instructions 210, device data 212, communication protocols 214, and device management logic 216. Data storage 206 comprises one or more volatile and/or non-volatile storage mechanisms, such as magnetic or optical storage for instance, which may be integrated in whole or in part with processor 204. Program instructions 210 may be executable by processor 204 to carry out various mobile-IPv6 router functions described herein. Device data 212 may include data such as a home address, a home agent address, a care-of address, and a HoAp. Additionally, device data 212 may include the IP addresses of one or more devices connected to mobile-IPv6 router 102.

Communication protocols 214 may be useful to receive data from and send data to one or more devices described herein, and may include any of the protocols mentioned herein, as well as any other protocols now known or later developed. Compatible protocols may be stored in one or more devices with which mobile-IPv6 router 102 communicates. Device management logic 416 may be used to manage aspects of mobile-IPv6 router 102 such as memory and file management.

c. Exemplary Ipv6 Node

Figure 3:
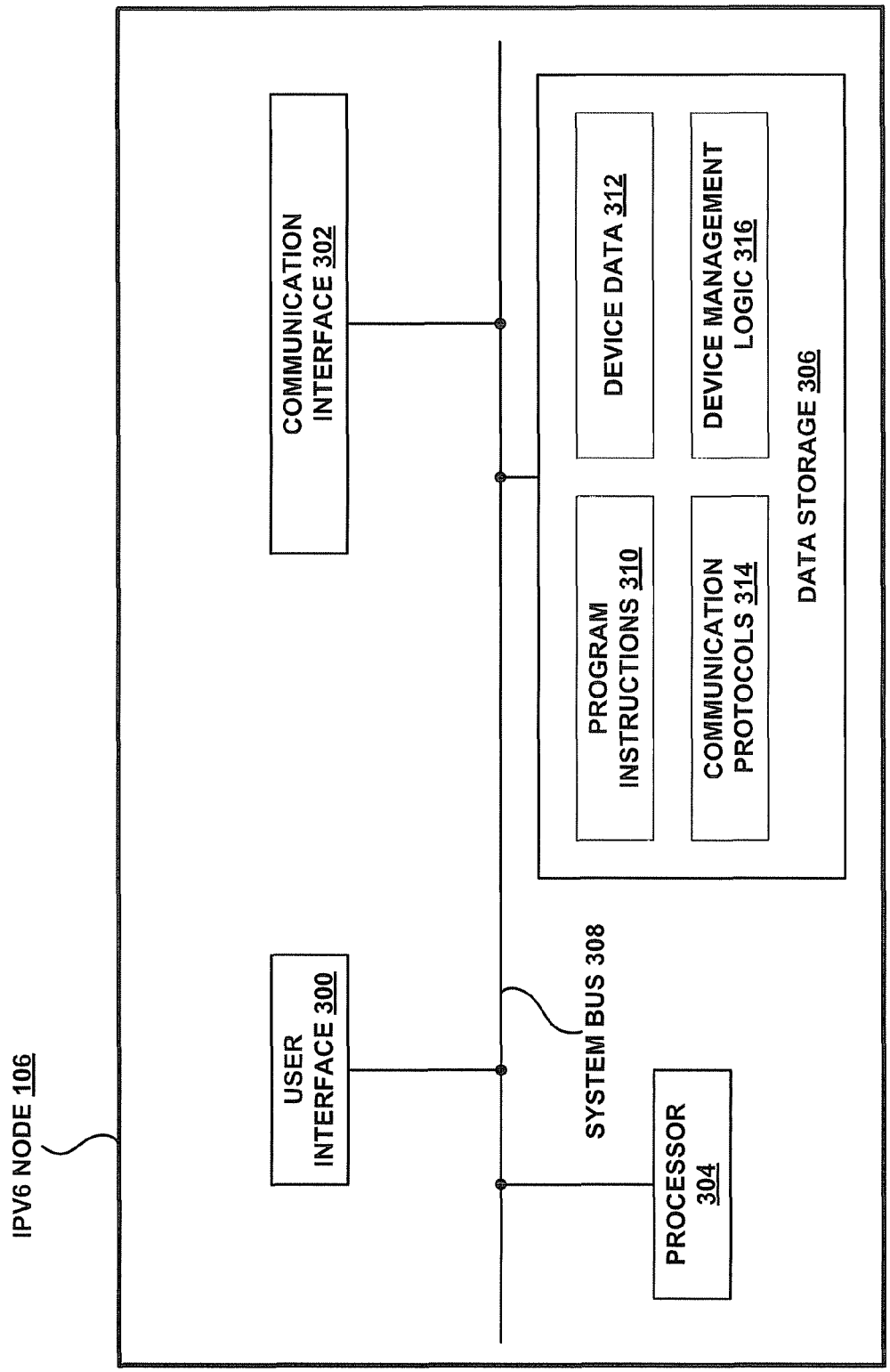
FIG. 3 is a simplified block diagram illustrating a typical IPv6 node.

Referring next to FIG. 3, a block diagram of an exemplary IPv6 node is provided, to illustrate functional components of such a device. IPv6 node 106 may take the form shown. As illustrated in FIG. 3, the exemplary IPv6 node includes a communication interface 300, a user interface 302 a processing unit 304, and data storage 306, all of which may be coupled together by a system bus, network, or other mechanism 308.

Communication interface 300 may include hardware and/or software that IPv6 node 106 may use to communicate over one or more packet-data networks such as foreign network 112, home network 108, correspondent network 110, and access network 120. Communication interface 300 may be configured to engage in wired and/or wireless communication, and thus may include a chipset arranged to communicate according to a protocol such as IEEE 802.11, a wired Ethernet interface, and/or one or more other types of communication interfaces. Communication interface 300 may make use of one or more antennas to facilitate wireless communication with one or more devices.

User interface 302 comprises input and output components to facilitate user interaction with the device. For voice communication, the user interface 302 preferably includes a microphone and speaker. For visual communication, the user interface 302 may then further include a display screen and perhaps a camera. Additionally, the user interface 302 preferably includes a keypad or other mechanism to facilitate tactile user input.

Processing unit 304 comprises one or more general purpose processors (e.g., INTEL microprocessors) and/or one or more special purpose processors (e.g., digital signal processors). Data storage 306, in turn, comprises one or more volatile and/or non-volatile storage mechanisms, such as memory and/or disc-drive storage for instance, which may be integrated in whole or in part with processing unit 304.

As shown, data storage 306 includes program logic 308 and reference data 310. Program logic 308 comprises one or more logic modules (applications), and preferably includes machine language instructions executable by processing unit 304 to carry out various functions described herein, such as to statelessly autoconfigure an IPv6 address. Reference data 310, in turn, includes data such the IPv6 address assigned to the IPv6 node.

2. Exemplary Operation a. Bootstrapping

Figure 4:
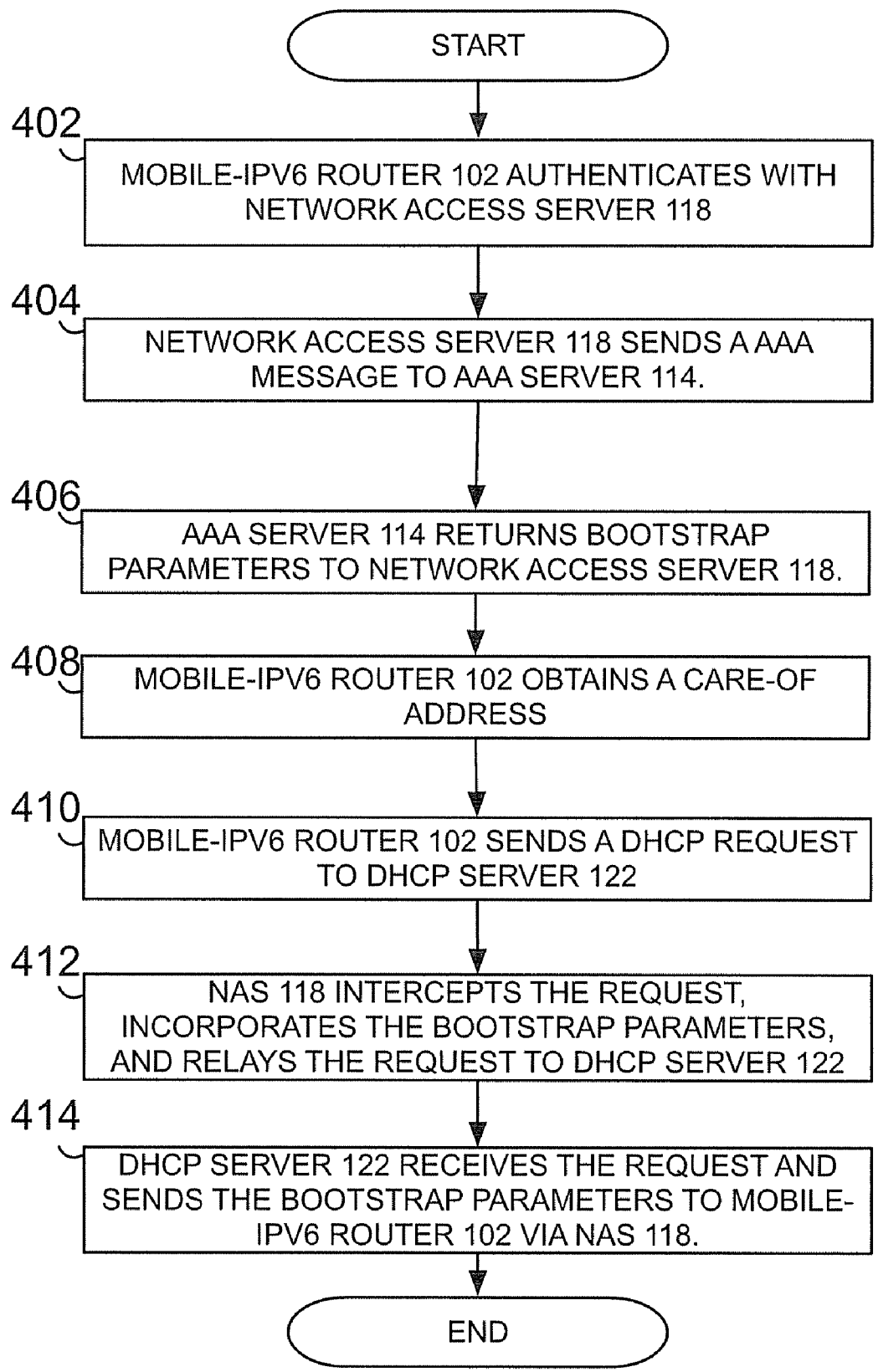
FIG. 4 is flow chart depicting how a mobile-IPv6 router bootstraps for information.

FIG. 4 is a flow chart depicting an example of how mobile-IPv6 router 102 may obtain bootstrap parameters. Here, the bootstrap parameters comprise a care-of address, a home-address, a home agent address, and a HoAp.

In order to obtain the bootstrap parameters, mobile-IPv6 router 102 must authenticate itself with AAA server 114. The authentication procedure allows mobile-IPv6 node 102 to demonstrate that it is authorized to use mobile-IPv6. If mobile-IPv6 router 102 is authorized to use mobile-IPv6, AAA server 114 will return the bootstrap parameters to NAS 118. Mobile-IPv6 router 102 will be able to obtain the bootstrap parameters from NAS 118 using a DHCP request.

As shown in FIG. 4, at block 402, mobile-IPv6 router 102 begins the authentication process by sending a network access authentication message to NAS 118. The network access authentication message indicates that mobile-IPv6 router 102 is authorized to use mobile-IPv6. Mobile-IPv6 router 102 may send the network access authentication message using an authentication procedure, such as 802.11i, or 802.1X, both of which are well known in the art. At block 404, NAS 118 communicates with AAA server 114 to confirm whether mobile-IPv6 router 102 is authorized to use mobile-IPv6 service. NAS 118 and AAA server 114 may communicate using AAA protocols such as remote authentication dial in user service (RADIUS) or DIAMETER. If mobile-IPv6 router 102 is authorized to use mobile-IPv6, AAA server 114 will associate with mobile-IPv6 router 102 a home address, a home agent address, and a HoAp. AAA server 114 may obtain these addresses by querying a database, or by requesting the addresses from home agent 104, for example.

Next, at block 406, AAA server 114 sends to NAS server 118 an access-accept message, indicating that mobile-IPv6 router 102 is authorized to use mobile-IPv6. Appended to the access-accept message are the bootstrap parameters, comprising a home address, a home agent address, and a HoAp assigned to mobile-IPv6 router 102. NAS server 118 then sends a message to mobile-IPv6 router 102, indicating that the authorization was successful.

At this point, mobile-IPv6 router has access to foreign network 112 and may obtain a care-of address and the bootstrap parameters. At block 408, mobile-IPv6 router 102 obtains a care-of address using stateless auto-configuration. For example, when mobile-IPv6 router 102 first connects to foreign network 112, it generates an interface identifier, which allows mobile-IPv6 router 102 to identify itself on the foreign network 112. To determine whether the interface identifier is unique, mobile-IPv6 router 102 sends a message containing its interface identifier to other devices on the network. If another device is using the same interface identifier, it will alert the mobile-IPv6 router 102 by sending it a message, which prompts mobile-IPv6 router 102 to configure a different interface identifier. If no other device is using the same identifier, mobile-IPv6 router 102 completes the configuration of its care-of address by receiving a router advertisement message from router 124.

As noted above, router advertisement messages are sent periodically by routers and contain network prefixes that client devices use for address-configuration. Mobile-IPv6 router 102 could wait for router 124 to automatically generate the router advertisement message, or mobile-IPv6 router 102 could send a router solicitation message to router 124, which causes router 124 to send a router advertisement. Upon receipt of the router advertisement message, mobile-IPv6 router 102 generates a care-of address by combining its interface identifier with the network prefix advertised by the router.

Figure 5:
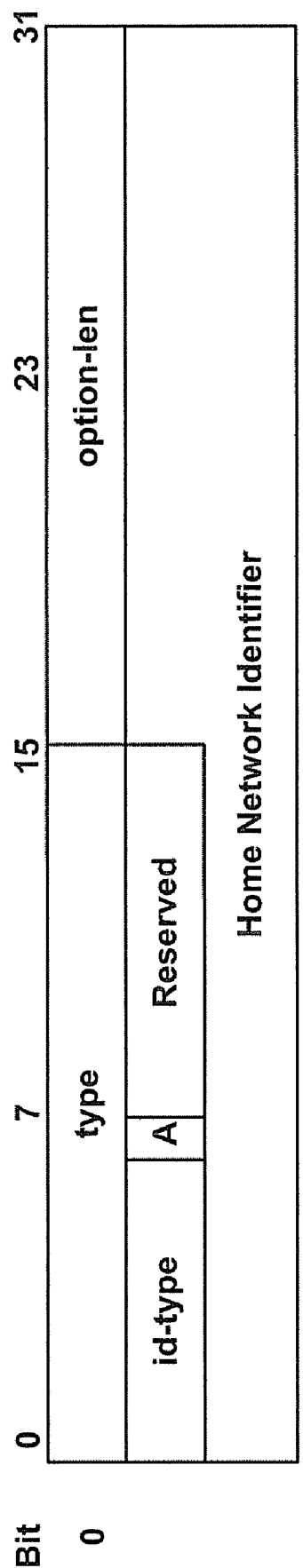
FIG. 5 is a simplified block diagram of a DHCP home network identifier option.

After obtaining a care-of address, mobile-IPv6 router 102 obtains the bootstrap parameters. At block 410, to obtain the bootstrap parameters, mobile-IPv6 router 102 sends a DHCP request message to DHCP server 122. DHCP request messages allow nodes to request information needed to configure IP addresses. Additionally, DHCP request messages can be used to obtain information about a mobile node's home network by appending a DHCP home network identifier options to the DHCP request. A DHCP home network identifier is shown in FIG. 5, and includes a "type" field, and "id-type" field, and "A" field, and a "home network identifier" field.

The "type" field identifies the DHCP option as a home network identifier. The "option length" field specifies the length of the home network identifier option. The "home network identifier" field includes the home network realm home network 108 (for example, "sprint.com"). The "id-type" field indicates whether mobile-IPv6 router 102 is seeking information about its home network or a different network. For example, an "id-type" value of 1 indicates that the mobile-node is seeking information about the network specified in the "home network identifier" field. The "A" field indicates whether mobile-IPv6 102 is requesting a home address.

Figure 6A:
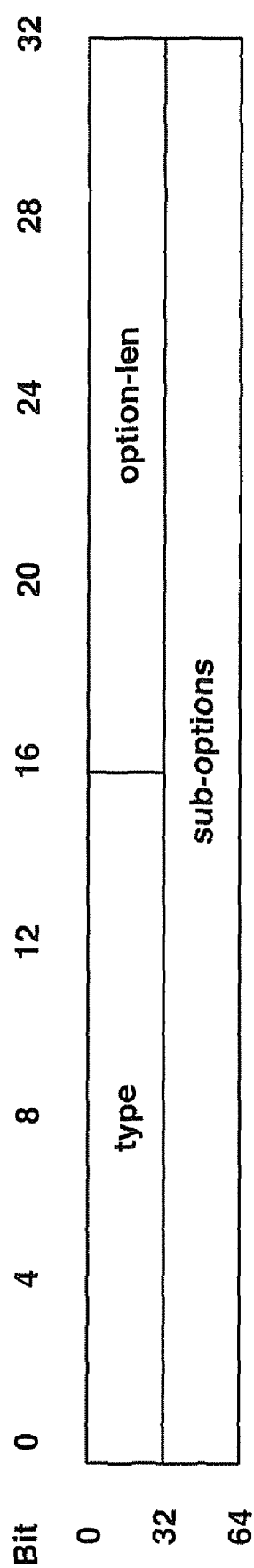
FIGS. 6A and 6B are simplified block diagrams of a mobile-IPv6 relay option.

At block 412, the DHCP request passes through NAS 118, which (1) incorporates the DHCP request and the bootstrap parameters inside a DHCP relay-forward message, and (2) sends the relay-forward message to DHCP server 122. The DHCP relay-forward message ensures that DHCP messages sent between mobile-IPv6 router 102 and DHCP server 122 passes through NAS 118. Information, such as the bootstrap parameters, can be appended to the relay-forward message by using a relay-option. One example of a relay-option is the DHCP mobile-IPv6 relay option, which is shown in greater detail in FIGS. 6A and 6B. As shown in FIG. 6A, the relay option includes a "type" field, an "option-len" field, and a "sub-options field." The "type" field, which identifies the message as a mobile-IPv6 relay option. The "option-len" field indicates the length of the relay message. The "sub-options" field includes a bootstrap parameter. There can be multiple sub-options in a mobile-IPv6 relay option.

Figure 6B:
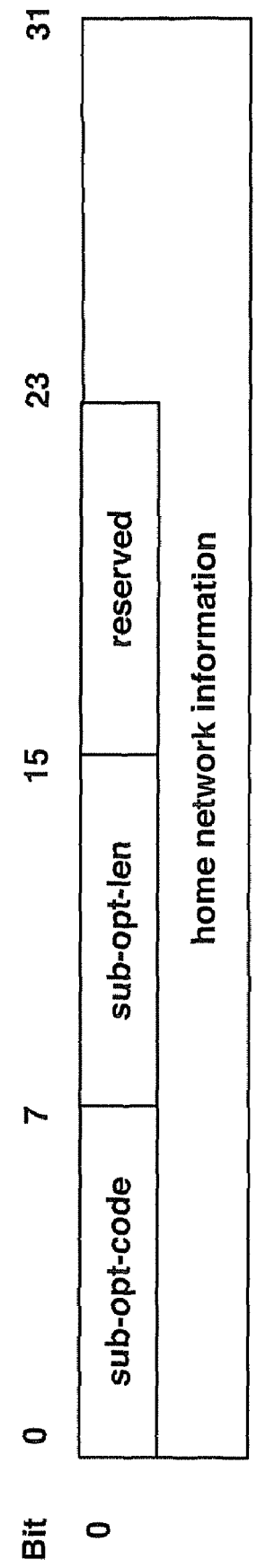

The sub-options field is shown in FIG. 6B, and includes a "sub-opt-code" field, a "sub-opt-len" field, and a "home network information" field. The "home network information" field includes one of the bootstrap parameters. The "sub-opt-code" field identifies which bootstrap parameter is being transmitted inside the "home network information" field. For example, if the "sub-opt-code" is 0, the "home network information" field includes the HoAp. If the "sub-opt-code" is 1, the "home network information field" includes the IP address of home agent 104. If the "sub-opt-code" is 3, the "home-network-information" field includes the home address of mobile-IPv6 router 102. The "sub-opt-len" field indicates the length of the sub-option. If the sub-option field includes the HoAp, the "sub-opt-len" field would indicate the length of the HoAp.

At block 414, DHCP server 122 receives the relay-forward message and extracts the bootstrap parameters from the mobile-IPv6 relay option. DHCP server 122 then includes the bootstrap parameters in a DHCP relay-reply message, and sends the message to NAS 118. NAS 118 extracts the bootstrap parameters, and sends them to mobile-IPv6 router 102. The DHCP relay-reply message includes a "home network information option," which contains the bootstrap parameters. The "home network information option" format is similar to the mobile-IPv6 relay option shown in FIG. 6A, however the "type" field indicates that the option is a home network information option.

Figure 7:
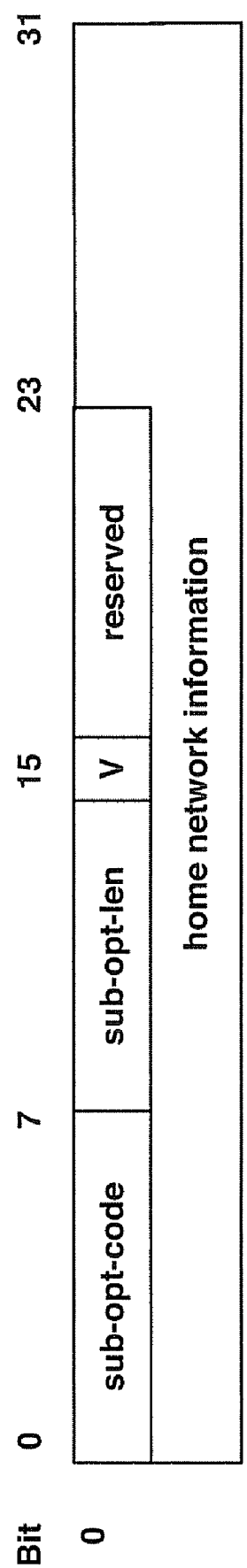
FIG. 7 is a simplified block diagram of a DHCP home network information option.

The "sub-options" field is shown in FIG. 7. As shown in FIG. 7, the "sub-options" field includes a "sub-opt-code" field, a "sub-opt-len" field, a "V" field, and a "home network information" field. The "home network information" field includes a bootstrap parameter. The "sub-opt-code" field identifies the bootstrap parameter that is being transmitted inside the "home network information" field. For example, if the "sub-opt-code" is 0, the "home network information" field includes the HoAp. If the "sub-opt-code" is 1, the "home network information field" includes the IP address of home agent 104. If the "sub-opt-code" is 3, the "home-network-information" field includes the home address of mobile-IPv6 router 102. The "sub-opt-len" field indicates the length of the sub-option. The "V" field indicates whether the home-network information is being assigned by the home network or by a foreign network.

At this point, mobile-IPv6 router has all of the parameters it needs to engage in mobile-IPv6 communication, and to provision mobile-IP addresses to IPv6 nodes.

b. Binding

Figure 8:
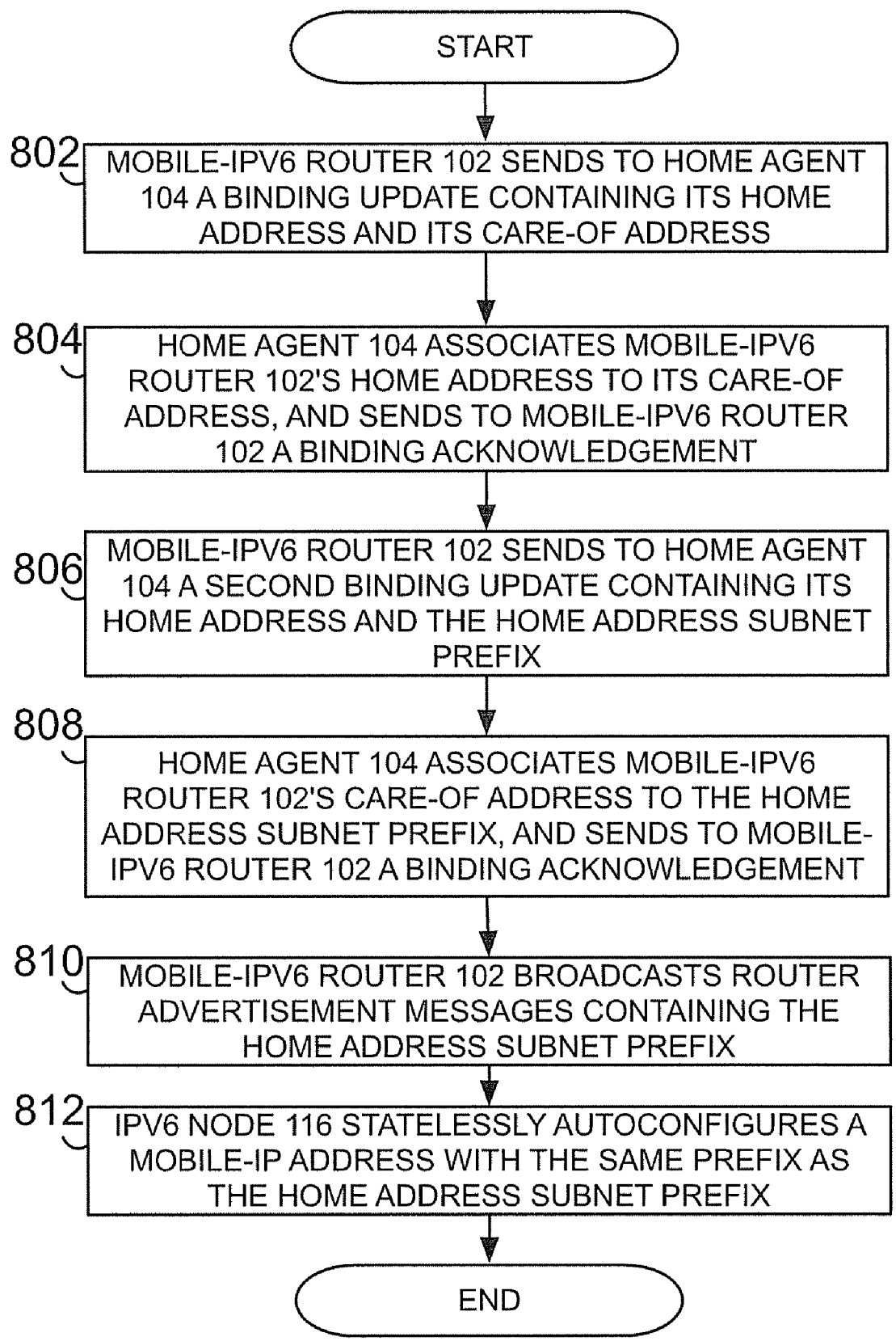
FIG. 8 is a flow chart depicting a mobile-IPv6 router binding its home address and its HoAp to its care-of address.

FIG. 8 is a flow chart depicting how mobile-IPv6 router binds its home address and the HoAp to its care-of address. It should be understood that while this example describes mobile-IPv6 router 102 as binding its home address before the HoAp, mobile-IPv6 102 may bind its home address and the HoAp in any order. At step 802, mobile-IPv6 router 102 sends to home agent 104 a binding update message containing its home address and its care-of address. At step 804, home agent 104 receives the binding update, and associates the mobile-IPv6 router 102's home address with its care-of address. Home agent 104 then sends a binding acknowledgement message to mobile-IPv6 router 102, indicating that it successfully received and processed the binding update. At this point, packets addressed to the home address of mobile-IPv6 router 102 may be forwarded by home agent 104 directly to mobile-IPv6 router 102.

It should be understood that there are many ways in which home agent 104 may associate mobile-IPv6 router 102's home-address with mobile-IPv6 router 102's care-of address. For example, home agent 104 may utilize a binding table to store mobile nodes' home addresses and care-of addresses and to map those addresses to one-another. Upon receipt of a binding update, home agent 104 may enter the addresses within the binding update into the binding table in order to store a mapping between the two addresses.

At step 806, upon receipt of the binding acknowledgement, mobile-IPv6 router 102 sends a second binding update containing its care-of address and the HoAp to home agent 104. The HoAp is contained in a mobility option appended to the binding update. A Mobility option is an optional field that can be appended to a binding update message, and contains additional information a home agent. In this case, the mobility option includes the HoAp as well as the length of the HoAp. At step 808, home agent 104 receives the binding update and associates the HoAp with mobile-IPv6 router 102's care-of address. Home agent 104 may also associate the length of the HoAp with the HoAp. Next, home agent 104 sends a second binding acknowledgement message to mobile-IPv6 router 102, indicating that it successfully received and processed the binding update.

At this point, when home agent 104 receives a packet it reads the packet's destination IP address. Home agent 104 then extracts a prefix from the destination IP address. Home agent 104 determines the length of the destination IP address's prefix by using the prefix length of the HoAp. After extracting the destination IP address's prefix, home agent 104 compares it to the HoAp. If the destination IP address's prefix is the same as the HoAp, home agent 104 will forward the packet to the care-of address of mobile-IPv6 router 102.

At step 808, after receiving the binding acknowledgement, mobile-IPv6 router 102 broadcasts router advertisement messages. The router advertisement messages include the HoAp, and enable nodes connecting to mobile-IPv6 router 102 to statelessly autoconfigure mobile-IP addresses having the same prefix as the HoAp. At step 810, IPv6 node 106 receives the router advertisement message broadcasted by mobile-IPv6 router 102. IPv6 node 106 then generates a mobile-IP address through stateless autoconfiguration by combining its interface identifier with the HoAp advertised by mobile-IPv6 router 102. By configuring a mobile-IP address using the HoAp, IPv6 node 106 will remain reachable at the same address if mobile-IPv6 router 102 moves to a different network.

3. Conclusion

An embodiment of the present invention has been described above. Those skilled in the art will understand, however, that changes and modifications may be made to this embodiment without departing from the true scope and spirit of the present invention, which is defined by the claims.

The invention claimed is:

1. A method comprising:
    a mobile internet protocol ("mobile-IP") device obtaining a care-of address;
    the mobile-IP device receiving bootstrap parameters, wherein the bootstrap parameters include a home address subnet prefix, wherein the home address subnet prefix defines a range of home addresses, and wherein the home address subnet prefix has been assigned to the mobile-IP device by a home agent;
    the mobile-IP device sending to the home agent a first binding update, wherein the first binding update (i) includes the home address subnet prefix and the care-of address of the mobile-IP device, and (ii) causes the home agent to associate the range of home addresses defined by the home address subnet prefix with the care-of address of the mobile-IP device; and
    the mobile-IP device broadcasting to an internet protocol version 6 ("IPv6") node a router advertisement message, wherein the router advertisement message includes the home address subnet prefix, and wherein the router advertisement message causes the IPv6 node to obtain a mobile-IP address based on the home address subnet prefix, wherein the mobile-IP address is a home address of the IPv6 node.

2. The method of claim 1, wherein the first binding update includes a length of the home address subnet prefix.

3. The method of claim 1, wherein the bootstrap parameters include a mobile-IP address of the mobile-IP device.

4. The method of claim 3, wherein the mobile-IP address of the mobile-IP device is a home address of the mobile-IP device.

5. The method of claim 3, further comprising:
    the mobile-IP device sending to the home agent a second binding update, wherein the second binding update causes the home agent to associate the mobile-IP address of the mobile-IP device with the care-of address of the mobile-IP device.

6. The method of claim 1, wherein the router advertisement message defines a prefix information field that includes the home address subnet prefix.

7. The method of claim 1, wherein the home agent associates the home address subnet prefix with the care-of address of the mobile-IP device by storing a mapping between the home address subnet prefix and the care-of address of the mobile-IP device.

8. A system comprising:
    a mobile internet protocol ("mobile-IP") device;
    a home agent;
    wherein the mobile-IP device is arranged to (i) obtain a care-of address, (ii) obtain bootstrap parameters, wherein the bootstrap parameters include at least a home address subnet prefix, wherein the home address subnet prefix defines a range of home addresses, and wherein the home address subnet prefix has been assigned by the home agent, (iii) broadcast a router advertisement messages, wherein the router advertisement messages include the home address subnet prefix, and wherein at least one of the router advertisement messages cause an internet protocol version 6 ("IPv6") node to obtain a mobile-IP address based on the home address subnet prefix, wherein the mobile-IP address is a home address of the IPv6 node and (iv) send a first binding update to the home agent, wherein the first binding update includes the home address subnet prefix; and
    wherein the home agent is arranged to receive the first binding update and responsively associate the range of home addresses defined by the home address subnet prefix with the care-of address of the mobile-IP device.

9. The system of claim 8:
    wherein the bootstrap parameters further include a mobile-IP address associated with the mobile-IP device; and
    wherein the mobile-IP device is further arranged to send a second binding update to the home agent, wherein the second binding update includes the mobile-IP address.

10. The system of claim 9, wherein the home agent is further arranged to receive the second binding update and responsively associate the mobile-IP address associated with the mobile-IP device with the care-of address of the mobile-IP device.

11. The system of claim 8, wherein the mobile-IP device is a router.

* * * * *